United States Patent
Yamato et al.

(10) Patent No.: US 7,829,186 B2
(45) Date of Patent: Nov. 9, 2010

(54) POROUS FILMS WITH CHEMICAL RESISTANCE

(75) Inventors: Yo Yamato, Himeji (JP); Michio Tsuyumoto, Himeji (JP)

(73) Assignee: Daicel Chemical Industries, Ltd., Osaka (JP)

(*) Notice: Subject to any disclaimer, the term of this patent is extended or adjusted under 35 U.S.C. 154(b) by 0 days.

(21) Appl. No.: 10/572,548

(22) PCT Filed: Sep. 15, 2004

(86) PCT No.: PCT/JP2004/013860

§ 371 (c)(1),
(2), (4) Date: Mar. 17, 2006

(87) PCT Pub. No.: WO2005/030849

PCT Pub. Date: Apr. 7, 2005

(65) Prior Publication Data

US 2007/0036959 A1    Feb. 15, 2007

(30) Foreign Application Priority Data

Sep. 25, 2003  (JP) .............................. 2003-334108

(51) Int. Cl.
*B32B 3/26* (2006.01)
*B32B 3/00* (2006.01)

(52) U.S. Cl. ............... 428/304.4; 428/315.5; 428/315.7
(58) Field of Classification Search .............. 428/304.4, 428/315.5, 315.7

See application file for complete search history.

(56) References Cited

U.S. PATENT DOCUMENTS

| 3,953,566 A | 4/1976 | Gore |
| 4,791,144 A * | 12/1988 | Nagou et al. .................. 521/90 |
| 5,677,366 A | 10/1997 | Wu |
| 6,261,721 B1 * | 7/2001 | Andrieu et al. ............. 429/249 |
| 2003/0107150 A1 | 6/2003 | Hamanaka et al. |
| 2004/0086782 A1* | 5/2004 | Zhang et al. ................. 429/142 |

FOREIGN PATENT DOCUMENTS

| EP | 1 230 970 A1 | 8/2002 |
| EP | 1 464 380 A1 | 10/2004 |
| JP | 36-4731 B1 | 5/1961 |
| JP | 57-212237 A | 12/1982 |

(Continued)

OTHER PUBLICATIONS

English abstract of JP 2003-138057, see above for date and inventor.*

*Primary Examiner*—Victor S Chang
(74) *Attorney, Agent, or Firm*—Birch, Stewart, Kolasch & Birch, LLP (57) ABSTRACT

A porous film with chemical resistance of this invention includes a porous film base covered with a chemical-resistant polymeric compound and has a multiplicity of communicating micropores having an average pore size of 0.01 to 10 μm. The chemical-resistant polymeric compound can be, for example, any of phenolic resins, urea resins, melamine resins, benzoguanamine resins, polyimide resins, epoxy resins, benzoxazine resins, polypropylene resins, polyurethane resins, fluororesins, alkyd resins, cellulose acetate resins, phthalic resins, maleic resins, and silicone resins.

3 Claims, 1 Drawing Sheet

FOREIGN PATENT DOCUMENTS

| | | |
|---|---|---|
| JP | 61-201078 A | 9/1986 |
| JP | 63-27243 A | 2/1988 |
| JP | 63-215743 A | 9/1988 |
| JP | 8-283447 A | 10/1996 |
| JP | 09 156007 A | 6/1997 |
| JP | 10-265596 A | 10/1998 |
| JP | 2000-319442 A | 11/2000 |
| JP | 2001-67643 A | 3/2001 |
| JP | 2001-145826 A | 5/2001 |
| JP | 2003138057 A * | 5/2003 |

* cited by examiner

Fig. 1

POROUS FILMS WITH CHEMICAL RESISTANCE

TECHNICAL FIELD

The present invention relates to porous films that are excellent in chemical resistance, have substantially no skin layer (dense layer), and have a multiplicity of continuous micropores. These porous films can be used typically in membrane separation techniques such as microfiltration and separation/concentration or as a variety of base materials typically for cell separators, electrolytic capacitors, and circuit boards by using their pore properties or filling the pores with functional materials.

BACKGROUND ART

Polymers such as amide-imide polymers, imide polymers, sulfone polymers, fluoro polymers, and olefinic polymers are known as materials for constituting porous films. Porous films comprising such materials are produced, for example, by a method (phase conversion method) in which mixtures containing the polymers are cast as films and then introduced to solidifying liquids. The resulting films produced by this method using the polymers, however, have skin layers (dense layers), and they have substantially no open pore or, if any, have low rates of open pores on their surfaces. For example, there are disclosed porous films comprising a polymide as a porous film using an imide polymer as a material, and production methods thereof (e.g., Japanese Unexamined Japanese Patent Application Publication (JP-A) No. 2001-67643, JP-A No. 2001-145826, and JP-A No. 2000-319442). These porous films must be produced via solvent substitution rate adjustors so as to open holes (pores) on their surfaces, thereby require complicated production processes, and still have insufficient rates of open pores and permeability.

When porous films are used in such forms as to be exposed to chemicals such as highly polar solvents, alkalis, and acids, the porous films may be dissolved and/or deformed as a result of swelling. As a possible solution to these problems, the chemical properties of the films may be improved by changing chemical substances constituting the porous films. However, there are a variety of requirements for such porous films on, for example, heat resistance, flexibility, hardness, color, easiness in production, pore size, porosity, porous structure, price, strength, and chemical properties, and it is difficult to choose constitutive materials that satisfy all of these requirements in good balance.

DISCLOSURE OF INVENTION

An object of the present invention is, therefore, to provide a porous film that is excellent in chemical resistance, has a high rate of open pores on its surface, and has homogeneous micropores from the surface layer to the core thereof.

Another object of the present invention is to provide a method for easily and conveniently producing the porous film.

After intensive investigations to achieve the above objects, the present inventors have found that a porous film that is excellent in chemical resistance and contains a multiplicity of communicating micropores can be obtained while taking advantage as a porous film, by covering a porous film with a polymer having excellent chemical resistance. The present invention has been achieved based on these findings.

Specifically, the present invention provides a porous film with chemical resistance, comprising a porous film base, and a chemical-resistant polymeric compound covering the porous film base, in which the porous film has a multiplicity of communicating micropores, and the micropores have an average pore size of 0.01 to 10 μm. The porous film has, for example, a thickness of about 5 to about 200 μm and a porosity of about 30% to about 80%.

The chemical-resistant polymeric compound includes phenolic resins, urea resins, melamine resins, benzoguanamine resins, polyimide resins, epoxy resins, benzoxazine resins, polypropylene resins, polyurethane resins, fluororesins, alkyd resins, cellulose acetate resins, phthalic resins, maleic resins, silicone resins, triazine resins, furan resins, polyester resins, xylene resins, poly(vinyl alcohol)s, ethylene/vinyl alcohol copolymers, chitins, and chitosans.

The present invention further provides a method for producing the porous film according to the present invention, comprising the steps of immersing a porous film base in a solution of a chemical-resistant polymeric compound, the porous film base comprising a multiplicity of communicating micropores having an average pore size of 0.01 to 10 μm, or spraying or applying the solution to the porous film base; and drying the resulting article to cover the porous film base with the chemical-resistant polymeric compound to thereby yield the porous film.

In addition, the present invention provides a method for producing the porous film according to the present invention, comprising the steps of immersing a porous film base in a solution of a precursor of a chemical-resistant polymeric compound, the porous film base comprising a multiplicity of communicating micropores having an average pore size of 0.01 to 10 μm, or spraying or applying the solution to the porous film base; drying the resulting article; and subjecting the dried article to treatment with at least one selected from the group consisting of heat, ultraviolet rays, visible radiations, electron beams, and radioactive rays to cover the porous film base with the chemical-resistant polymeric compound to thereby yield the porous film.

The porous films according to the present invention are excellent in chemical resistance and have homogenous pores with excellent properties. They can therefore be used in membrane separation techniques such as microfiltration and separation/concentration and can be used as a variety of base materials typically for cell separators, electrolytic capacitors, and circuit boards by using their pore properties or filling the pores with functional materials.

The production methods according to the present invention can produce the porous films having such excellent chemical resistance and pore properties by easy and convenient operations.

BEST MODE FOR CARRYING OUT THE INVENTION

The porous films according to the present invention each have a configuration in which a porous film base is covered with a chemical-resistant polymeric compound. Specifically, the porous films according to the present invention comprise a porous film base and a chemical-resistant coat covering the surface of the porous film base and have chemical resistance.

Materials constituting the porous film base include, but are not limited to, polymers such as amide-imide polymers, imide polymers, amide polymers, sulfone polymers, cellulosic polymers, acrylic polymers, fluoro polymers, olefinic polymers, aramid polymers, polyimidazoles, polyetherimides, poly(p-phenylenebenzoxazole)s, poly(phenylene sulfide)s, liquid crystalline polyesters, polyarylates, polyether ether ketones, and poly(butylene terephthalate)s. Among them, for example, amide-imide polymers, imide polymers, polyethersulfones, polysulfones, acrylic polymers, and cellulose acetates are preferred. Each of these polymers can be used alone or in combination.

The "chemicals" in the present invention refer to substances that reduce the functions of conventional porous films as a result of dissolution, swelling, shrinkage and/or decomposition of resins constituting the conventional porous films. The "chemical" vary depending on the types of resins constituting the porous films and cannot be simply defined. Specific examples of the chemicals include highly polar solvents such as dimethyl sulfoxide (DMSO), N,N-dimethylformamide (DMF), N,N-dimethylacetamide (DMAc), N-methyl-2-pyrrolidone (NMP), 2-pyrrolidone, cyclohexanone, acetone, methyl acetate, ethyl acetate, ethyl lactate, acetonitrile, methylene chloride, chloroform, tetrachloroethane, and tetrahydrofuran (THF); basic solutions; acidic solutions; and mixtures of these.

The basic solutions include aqueous solutions and solutions in organic solvents of alkalis (bases) including inorganic salts such as sodium hydroxide, potassium hydroxide, calcium hydroxide, sodium carbonate, and potassium carbonate; amines such as triethylamine; and ammonia. The acidic solutions include aqueous solutions and solutions in organic solvents of acids. Such acids include inorganic acids such as hydrochloric acid, sulfuric acid, and nitric acid; and organic acids such as acetic acid and phthalic acid.

The term "porous film with chemical resistance" as used in the present invention means a film that undergoes no deterioration such as dissolution or deformation due to swelling upon contact with the chemicals such as highly polar solvents, alkalis (bases), and acids or undergoes, if any, less deterioration to such an extent as not to affect the purpose and use thereof. For example, in uses in which a porous film is brought into contact with a chemical in a short time, the porous film may have such a chemical resistance as not to deteriorate within the contact time.

The chemical-resistant polymeric compounds are not specifically limited, as long as they have excellent resistance to chemicals such as highly polar solvents, alkalis (bases), and acids. Examples thereof include thermosetting resins or photo-curable resins such as phenolic resins, xylene resins, urea resins, melamine resins, benzoguanamine resins, benzoxazine resins, alkyd resins, triazine resins, furan resins, unsaturated polyesters, epoxy resins, silicone resins, polyurethane resins, and polyimide resins; and thermoplastic resins such as poly(vinyl alcohol)s, cellulose acetate resins, polypropylene resins, fluororesins, phthalic resins, maleic resins, saturated polyesters, ethylene/vinyl alcohol copolymers, chitins, and chitosans. Each of these polymeric compounds can be used alone or in combination. The polymeric compounds may also be copolymers or graft polymers.

Most chemical-resistant polymeric compounds also have heat resistance, and there is a low possibility that the heat resistance of the porous film covered with a polymeric compound is reduced, as compared with the heat resistance of the porous film base without covering.

The porous films according to the present invention are covered with such chemical-resistant polymeric compounds, are thereby resistant to deterioration and can exhibit excellent chemical resistance even when brought into contact with or used in combination with chemicals such as highly polar solvents, alkalis (bases), and acids.

The "chemical resistance" of the porous films in the present invention can be indicated by, for example, change in shape of a film between before and after bringing the film into contact with a chemical (rate of dimensional change) as an index. The rate of dimensional change indicates the rate of change determined in the following manner. Initially, three points constituting a right triangle having sides with lengths of 8 to 30 mm are positioned on a sample film, the sample film is immersed in a chemical, and the rate of change in distances between two of the three points (a, b, and c) before and after immersion [or after immersion and subsequent drying]. More specifically, distances between two of the three points on the film before immersion in a chemical ($a_1$, $b_1$, and $c_1$), and distances between two of the three points after immersing the film in a chemical for, for example, two minutes [or after the immersion and subsequent drying] ($a_2$, $b_2$, and $c_2$ [or $a_3$, $b_3$, and $C_3$]) are determined, and the rate of dimensional change can be determined by calculation according to the formula: $\{(a_2 [\text{or } a_3] - a_1)/a_1\} \times 100$. The rates of change on b ($b_1$, $b_2$, and $b_3$) and c ($c_1$, $c_2$, and $C_3$) can also be determined by calculation according to the same procedure. When the rate of change is positive (plus), it means that the film expands (swells). When the rate of change is negative (minus), it means that the film shrinks. The porous films according to the present invention have chemical resistance of, for example, within ±10%, preferably within ±7%, more preferably within ±4%, and particularly preferably within ±2% in terms of the rate of dimensional change as an index (such chemical resistance that all the rates of change in distances between two of the three points after immersion and after drying fall within the above-specified ranges).

Other examples of indexes to the chemical resistance are as follows. For example, the alkali resistance of a porous film comprising an imide-containing polymer, such as an amide-imide polymer or an imide polymer, can be indicated by, as an index, the change in absorptions (rate of decrease in peak) at around 1720 and 1780 $cm^{-1}$, which absorptions indicate imide groups, in infrared absorption spectral analysis of the film before and after contact with an alkali (base). For example, when the absorptions at around 1720 and 1780 $cm^{-1}$ disappear, namely, when the rate of decrease in peak is 100%, it indicates that imide groups in the polymer are hydrolyzed by the action of the alkali to form a carboxylic acid and means that the film in question does not have alkali resistance. When the porous films according to the present invention are films comprising imide-containing polymers, they have such-alkali resistance that the rate of decrease in peak of absorptions at around 1720 and 1780 $cm^{-1}$ is, for example, less than about 50%.

In general, porous films must have well-balanced properties including chemical properties such as hydrophilicity or affinity for organic solvents; physical properties such as heat resistance, flexibility, hardness, color, pore size, porosity, porous structure, and strength; and economical properties such as easiness in production and price. According to the present invention, the porous film base has a surface covered with a polymeric compound excellent in chemical resistance. Therefore, in addition to the properties of the porous film base, the porous films can have adjusted properties including chemical properties such as hydrophilicity or affinity for organic solvents; and physical properties such as flexibility, hardness, color, and strength, by appropriately selecting, for example, the type and degree of polymerization of the chemical-resistant polymeric compound, and the thickness of a coat of the polymeric compound.

The hydrophilicity of the porous films, for example, can be adjusted by appropriately selecting the type, degree of polymerization, coating thickness, and coating conditions of the polymeric compound which covers the porous film base. Particularly, when the formation of coat includes a heating process, the hydrophilicity of the porous films on their surfaces can be improved by appropriately setting the heating temperature and time so that a high proportion of hydrophilicity groups in the polymeric compound constituting the coat remains.

The porous films according to the present invention have a multiplicity of communicating micropores (continuous micropores), and the micropores have an average pore size, namely, an average pore size on the surface of the films, of 0.01 to 10 μm. The average pore size of the micropores is preferably 0.05 to 5 μm. When the micropores have excessively small pore sizes, the permeability may deteriorate. If they have excessively large pore sizes, the efficiency of separation/concentration, for example, may deteriorate. When a functional material is charged into the pores, it is preferably charged with resolution on the order of submicrons to microns, and the average pore size preferably falls within the above-specified range. If it is excessively small, the functional material may not be charged into the pores. If it is excessively large, the control on the order of submicrons to microns may be difficult. The largest pore size of the surface of the films is preferably 15 μm or less.

The thickness of the porous films is, for example, 5 to 200 μm, preferably 10 to 100 μm, and more preferably 20 to 80 μm. If the thickness is excessively small, the films may have insufficient mechanical strength. In contrast, if it is excessively large, the pore size distribution may not be controlled homogenously. The average rate of open pores inside the porous films (porosity) is, for example, 30% to 80%, preferably 40% to 80%, and more preferably 45% to 80%. If the porous films have an excessively low porosity, they may not have sufficient permeation performance or may not exhibit the function of a functional material, if any, charged into the pores. In contrast, if the porous films have an excessively high porosity, they may have poor mechanical strength. The rate of open pores of the surface of the porous films (rate of surface open pores) is, for example, about 48% or more (e.g., about 48% to about 80%), and preferably about 60% to about 80%. If the rate of surface open pores is excessively low, the porous films may not have sufficient permeation performance or may not exhibit the function of a functional material, if any, charged into the pores. In contrast, if it is excessively high, the porous films may have poor mechanical strength.

The communicating ability (continuity) of micropores in the films can be determined typically using, as an index, the air-permeability determined with a Gurley instrument (hereinafter referred to as "Gurley air-permeability") and pure-water permeation rate. The Gurley air-permeability of the porous films is, for example, 0.2 to 2000 seconds per 100 cc, preferably 1 to 1000 seconds per 100 cc, and more preferably 1 to 500 seconds per 100 cc. If the Gurley air-permeability is excessively high, the porous films may have insufficient practical permeation performance or may not exhibit the function of a functional material since the functional material may not be sufficiently charged. If it is excessively low, the porous films may have poor mechanical strength.

The pure-water permeation rate of the porous films is preferably $3.3 \times 10^{-9}$ to $1.1 \times 10^{-7}$ m·sec$^{-1}$·Pa$^{-1}$ [i.e., 20 to 700 L/(m$^2$·min·atm)] and more preferably $4.9 \times 10^{-9}$ to $8.2 \times 10^{-8}$ m·sec$^{-1}$·Pa$^{-1}$ [i.e., 30 to 500 L/(m$^2$·min·atm)]. If the pure-water permeation rate is excessively low, the porous films may have insufficient practical permeation performance or may not exhibit their functions since a functional material may not be sufficiently charged. If it is excessively large, the porous films may have poor mechanical strength.

Preferred porous films in the present invention include porous films which contain a multiplicity of communicating micropores having an average pore size of 0.01 to 10 μm and have a film thickness of 5 to 200 μm, a porosity of 30% to 80%, and an air-permeability in terms of Gurley air-permeability of 0.2 to 29 seconds per 100 cc, preferably 1 to 25 seconds per 100 cc, and more preferably 1 to 18 seconds per 100 cc. The air-permeability indicates the communicating ability of the micropores.

The porous films according to the present invention having the above-mentioned configurations can maintain the properties of the porous film base without deterioration. For example, the physical properties of the porous films according to the present invention, such as porosity, pore size, Gurley air-permeability, and pure-water permeation rate, are substantially at the same levels as those of the constitutive porous film base.

The porous films according to the present invention are excellent in chemical resistance and have homogeneous micropores. Accordingly, they can be used in wider fields in membrane separation techniques such as microfiltration and separation/concentration or for, for example, cell separators, electrolytic capacitors, and circuit boards, by utilizing the properties of pores without modification or by filling the pores with functional materials.

In the methods for producing the porous films according to the present invention, a porous film base comprising a multiplicity of communicating micropores having an average pore size of 0.01 to 10 μm, and preferably 0.05 to 5 μm is used.

Porous film bases for use in the present invention preferably further have properties required of porous films, in addition to the above-mentioned properties. Specifically, preferred porous film bases comprise materials constituting the above-mentioned porous film base, in which the average pore size of micropores is such that the largest pore size on the surface of the film is about 15 μm or less, the average rate of open pores (porosity) inside of the film is, for example, about 30% to about 80% and preferably about 40% to about 80%, the rate of open pores of the matrix surface (rate of surface open pores) is, for example, about 48% or more (e.g., about 48% to 80%, and preferably about 60% to 80%). The bases may satisfy not all but any of these properties. The thickness of the porous film bases is, for example, 5 to 200 μm and preferably 10 to 100 μm.

These porous film bases can be, for example, produced by (i) a method in which a solution containing one or more polymers constituting a porous film base is cast as a film on a substrate, and phase conversion is carried out to thereby yield a film; (ii) a method in which the polymer solution is cast as a film on a substrate, a solvent substitution rate adjuster is laminated on at least one side thereof, and the cast solution is brought into contact with a solidifying solvent with the interposition of the solvent substitution rate adjuster to thereby deposit a porous film (see, for example, JP-A No. 2000-319442 and JP-A No. 2001-67643); or (iii) a method in which a solution containing a polymer as a material constituting the porous film base, a good solvent, and a nonsolvent for the polymer is cast onto a substrate, and is then immersed in a solidifying solvent to thereby deposit a porous film (see, for example, JP-A No. 2001-145826). Instead of such a polymer as a material constituting the porous film base, a precursor such as a monomer component (raw material) of the polymer or an oligomer thereof may be used.

The molded films according to the above methods may further be subjected to crosslinking treatment with, for example, heat, visible radiations, ultraviolet rays, electron beams, or radioactive rays. For example, a porous polyimide film base can be prepared by subjecting a film of a polyimide precursor typically to thermal imidization or chemical imidization. A film formed using an amide-imide polymer can be subjected to heat-induced crosslinking.

Porous film bases obtained by, of the above-mentioned methods, the method (i) are preferably used in the present invention.

In the method (i), polymers as materials constituting the porous film base are preferably those that have solubility in water-soluble polar solvents and can form films by phase conversion. Specific examples thereof are amide-imide polymers, imide polymers, polyethersulfones, polysulfones, acrylic polymers, and cellulose acetates, as well as mixtures of these polymers.

Examples of preferred porous film bases are film-like molded articles mainly comprising amide-imide polymers or imide polymers that have heat resistance, can undergo thermoforming, and are excellent in mechanical strength, chemical resistance, and electric properties. Amide-imide polymers can be generally produced by polymerization as a result of a reaction between trimellitic anhydride and a diisocyanate or a reaction between anhydrous trimellitic chloride and a diamine, and subsequent imidization. Imide polymers can be produced, for example, by reacting a tetracarboxylic acid component with a diamine component to yield a polyamic acid, and imidizing the polyamic acid.

The amide-imide polymers can be obtained by the above-mentioned method. Imide polymers show poor solubility after imidization. Accordingly, when the porous film bases comprise imide polymers, they are often formed by forming porous films of polyamic acid and subjecting the porous films to imidization such as thermal imidization or chemical imidization. The addition of a water-soluble polymer and/or water is effective for the film structure to be spongiform and porous. Examples of water-soluble polymers are poly(ethylene glycol)s, polyvinylpyrrolidones, poly(ethylene oxide)s, poly(vinyl alcohol)s, poly(acrylic acid)s, polysaccharides and derivatives thereof, and mixtures of these polymers. The molecular weights of the water-soluble polymers are preferably 5000 or more, particularly preferably $1 \times 10^4$ or more (e.g., about $1 \times 10^4$ to about $20 \times 10^4$). Good solvents for the amide-imide polymer or polyamic acid include dimethylacetamide (DMAc), N-methyl-2-pyrrolidone (NMP), N,N-dimethylformamide, and NMP/xylene mixed solvents. A good solvent having solubility can be selected as appropriate according to the chemical skeleton of the polymer to be used.

The polymer solution subjected to flow casting is preferably a mixed solution containing, for example, 8 to 25 percent by weight of a polymeric component as a material constituting porous films, 10 to 50 percent by weight of a water-soluble polymer, 0 to 10 percent by weight of water, and 30 to 82 percent by weight of a water-soluble polar solvent. The water-soluble polymer can be those listed in the production of the preferred porous film bases. For yielding satisfactorily porous films, the molecular weights of water-soluble polymers are preferably 1000 or more, more preferably 5000 or more, and particularly preferably $1 \times 10^4$ or more (e.g., about $1 \times 10^4$ to about $20 \times 10^4$). Examples of water-soluble polar solvents are dimethyl sulfoxide, N,N-dimethylformamide, N,N-dimethylacetamide (DMAc), N-methyl-2-pyrrolidone (NMP), 2-pyrrolidone, and mixtures of these. Water-soluble polar solvents having solubility with respect to the chemical skeleton of the polymer used as the polymeric component (good solvents for the polymeric component) can be used herein.

If the concentration of a polymer (polymeric component) as a main component of the base in the polymer solution is excessively low, the resulting film may have poor strength. If it is excessively high, the film may have a decreased porosity. The water-soluble polymer is added to the polymer solution so as to make the inside of the film have a homogenous, spongiform, porous structure. If the concentration of the water-soluble polymer is excessively low, coarse voids with size exceeding, for example, 10 μm may be formed inside the film to reduce the homogeneity. If it is excessively high, the solubility may deteriorate. The void sizes can be adjusted by controlling the amount of water and can be increased with an increasing amount of water.

Examples of the substrate are glass plates; plastic sheets comprising, for example, polyolefinic resins such as polyethylene and polypropylene, polyesters such as poly(ethylene terephthalate)s (PETs), polycarbonates, styrenic resins, fluororesins such as PTFEs (polytetrafluoroethylenes) and PVDFs (poly(vinylidene fluoride)s), vinyl chloride resins, and other resins; metal sheets such as stainless steel sheets and aluminum sheets. The substrate may be a composite sheet comprising a surface material and an inner material different from each other.

The flow casting of the polymer solution into a film is carried out preferably under conditions of relative humidity of 90% to 100% and a temperature of 30° C. to 80° C. and more preferably under conditions of relative humidity of about 100% (e.g., 95% to 100%) and a temperature of 40° C. to 70° C. If the moisture content in the air is less than the above-specified range, the rate of surface open pores may be insufficient.

After the flow casting of the polymer solution into a film, the cast film is preferably held in an atmosphere at relative humidity of 70% to 100% and a temperature of 15° C. to 90° C. for 0.2 to 15 minutes and then introduced into a solidifying liquid comprising a nonsolvent for the polymeric component.

By holding the film after flow casting under the above-mentioned condition, in particular, the rate of open pores of a surface of the film opposite to the substrate (hereinafter also referred to as "air-facing surface of the film") can be improved. This is probably because, by holding the film in a moisturized atmosphere, water enters from the surface into the inside of the film to thereby efficiently accelerate the phase separation of the polymer solution.

The solidifying liquid for use in phase conversion can be a solvent that solidifies the polymeric component and is selected as appropriate according to the type of a polymer used as the polymeric component. For example, it may be a solvent that solidifies an amide-imide polymer or polyamic acid. Examples thereof are water; alcohols including monohydric alcohols such as methanol and ethanol, and polyhydric alcohols such as glycerol; water-soluble polymers such as poly(ethylene glycol)s; and mixtures of these.

According to a preferred embodiment of the method (i) a polymer solution comprising, for example, 8 to 25 percent by weight of an amide-imide polymer or polyamic acid, 10 to 40 percent by weight of a water-soluble polymer having a molecular weight of 1000 or more, 0 to 10 percent by weight of water, and 30 to 82 percent by weight of a good solvent for the amide-imide polymer or polyamic acid is subjected to flow casting into a film; the film is held in an atmosphere at relative humidity of 70% to 100% and a temperature of 15° C. to 90° C. for 0.2 to 15 minutes and then introduced into (brought into contact with) a water-soluble solidifying liquid containing a nonsolvent for the amide-imide polymer or polyamic acid; and, in the case of polyamic acid, the film is further subjected to an imidization process.

The above-mentioned method can produce, for example, a porous film base that comprises an amide-imide polymer or imide polymer, contains a multiplicity of communicating micropores, and has an average pore size of micropores of 0.01 to 10 µm, a porosity of 30% to 80%, an air permeability in terms of Gurley air-permeability of 0.2 to 29 seconds per 100 cc, and a film thickness of 5 to 200 µm.

The Gurley air-permeability is 0.2 to 29 seconds per 100 cc, preferably 1 to 25 seconds per 100 cc, and more preferably 1 to 18 seconds per 100 cc. If the Gurley air-permeability is greater than the above range, the practical permeation performance may not be sufficient or the function of a functional material may not be exhibited because of insufficient charge of the functional material. In contrast, if it is smaller than the range, the mechanical strength may deteriorate. The pure-water permeation rate is preferably $3.3 \times 10^{-9}$ to $1.1 \times 10^{-7}$ m·sec$^{-1}$·Pa$^{-1}$ [i.e., 20 to 700 L/(m$^2$·min·atm)] and more preferably $4.9 \times 10^{-9}$ to $8.2 \times 10^{-8}$ m·sec$^{-1}$·Pa$^{-1}$ [i.e., 30 to 500 L/(m$^2$·min·atm)]. If the pure-water permeation rate is less than this range, the practical permeation performance may not be sufficient or the function of a functional material may not be exhibited because of insufficient charge of the functional material. In contrast, if it is greater than this range, the mechanical strength may deteriorate.

According to another preferred embodiment of the method (i), the porous film base is obtained by using such a polymer constituting the porous film base and a substrate that the difference (Sa−Sb) between the surface tension Sa [mN/m (=dyn/cm)] of the polymer and the surface tension Sb [mN/m (=dyn/cm)] of the substrate is −10 or greater, subjecting the polymer solution to flow casting onto the substrate as a film, and carrying out phase conversion to yield a film. According to this method, the polymer solution containing the polymeric component has a good phase-separation structure on the substrate, and the rate of open pores on the surface facing the substrate is increased. Thus, a porous film base having homogeneous micropores can be easily and conveniently obtained.

In the above-mentioned method, such a polymer and a substrate are used as to yield the difference (Sa−Sb) of −10 or greater. If the difference (Sa−Sb) is less than −10, the polymer aggregates at an interface between the polymer and the substrate to form a dense phase. Thus, the resulting film has such a low rate of surface open pores as not to bear practical use. Since such a polymer and a substrate as to yield a difference (Sa−Sb) of −10 or greater are used, the polymer solution containing the polymer undergoes phase separation on the substrate to form an islands-in-sea structure. This causes micropores of the film, and a porous film base having a high rate of open pores on the surface of the film in contact with the substrate (hereinafter also referred to as "substrate-facing surface of the film") can be obtained. The difference (Sa−Sb) is preferably greater than zero (0), since the polymer aggregated as a result of phase conversion cannot wet the surface of the substrate and is repelled to thereby open pores more efficiently. It is more preferably 3 or greater, further preferably 7 or greater, and most preferably 13 or greater. The upper limit of the difference (Sa−Sb) is not specifically limited and can be, for example, about 100.

The above-mentioned method can produce, for example, a porous film base having a multiplicity of communicating micropores, in which the both surfaces (both sides) of the porous film base have an average pore size of 0.01 to 10 µm, a ratio A/B of the average pore size A of the surface to the average pore size B of the inside of the matrix of 0.3 to 3, a ratio C/D of the average rate C of open pores of the surface to the average rate D of open pores of the inside of 0.7 to 1.5, and a film thickness of 5 to 200 µm. The porous film base has such homogenous and excellent properties of pores and is preferred as the porous film base for use in the present invention.

The ratios A/B and C/D are preferably 0.5 to 2 and 0.75 to 1.4, respectively, and more preferably 0.6 to 1.5 and 0.8 to 1.3, respectively. If these ratios are excessively low, the permeation performance may deteriorate or the functional material may not be charged sufficiently. If they are excessively high, inconvenience such as heterogenous charge of the functional material may occur.

The above-mentioned method can also produce a porous film base which contains a multiplicity of communicating micropores and has average pore sizes $A^1$ and $A^2$ of both surfaces of 0.01 to 10 µm, average rates $C^1$ and $C^2$ of open pores on both surfaces of 48% or more, a ratio $A^1/A^2$ of the average pore size $A^1$ of one surface to the average pore size $A^2$ of the other surface of 0.3 to 3, a ratio $C^1/C^2$ of the average rate of open pores $C^1$ of one surface to the average rate of open pores $C^2$ of the other surface of 0.7 to 1.5, and a film thickness of 5 to 200 µm.

The ratios $A^1/A^2$ and $C^1/C^2$ are preferably 0.5 to 2 and 0.75 to 1.4, respectively, and more preferably 0.6 to 1.5 and 0.8 to 1.3, respectively. If these ratios are excessively low, the permeation performance may deteriorate or the functional material may not be charged sufficiently. If they are excessively high, inconvenience such as poor separation properties or heterogenous charge of the functional material may occur.

The solvent substitution rate adjuster in the method (ii) is preferably one having such a permeability that a solvent for the polymer and a solidifying solvent can permeate when the flow-cast polymer solution in the form of a film is brought into contact with the solidifying solvent to thereby deposit a film. For example, the solvent substitution rate adjuster may preferably have an air permeability of to 1000 seconds per 100 cc (preferably 250 to 800 seconds per 100 cc), a film thickness of 5 to 500 µm (preferably 10 to 100 µm) and comprise holes (pores) with size of 0.01 to 10 µm, preferably 0.03 to 1 µm, which pores penetrate the film in a sectional direction and are dispersed at a sufficient density. Specific examples of such preferred solvent substitution rate adjusters are nonwoven fabrics or porous films comprising, as materials, polyolefins such as polyethylenes and polypropylenes; celluloses; and Teflon (registered trademark).

Methods for flow-casting the polymer solution into a film and laminating the solvent substitution rate adjuster thereon include, but are not limited to, a method in which the polymer solution is flow-cast onto a substrate, and the surface of the flow-cast article is covered with the solvent substitution rate adjuster; a method in which a thin layer of the polymer solution is applied onto a solution substitution rate adjuster by a spraying process or doctor blade process; and a method in which the polymer solution is extruded from a T-die into between solvent substitution rate adjusters to yield a three-layer laminated comprising a film and the solvent substitution rate adjuster arranged on both sides of the film.

The solidifying solvent herein can be, for example, those listed as the solidifying liquid for use in the phase conversion in the method (i). Among them, solvent mixtures of a nonsolvent and a solvent for the polymer constituting the film base are preferably used as the solidifying solvent in the method (ii), for homogenous porous structure.

When a polyimide precursor is used as the polymer in the method (ii), the film after conversion into a porous structure and removing the solvent substitution rate adjuster is subjected typically to thermal imidization or chemical imidization.

Preferred porous film base, polymer solution and substrate can be those listed in the method (i).

The method (ii) can be carried out using, for example, the components and procedures described in JP-A No. 2000-319442 and JP-A No. 2001-67643.

The above-mentioned method can produce, for example, porous film bases which contain a multiplicity of communicating micropores and have an average pore size of 0.01 to 5 µm, a porosity of 15% to 80% and preferably 30% to 80%, an air permeability of 30 seconds per 100 cc to 2000 seconds per 100 cc, and a film thickness of 5 to 100 µm.

The good solvent and nonsolvent for a polymer as a material constituting the porous film base in the method (iii) can be selected as appropriate according to the type of the polymer. For inhibiting the formation of a dense layer, a good solvent and a nonsolvent having such solubility parameters with difference therebetween of 5 $MPa^{1/2}$ or less are preferably used in combination. The solubility parameters of solvents can be easily found typically in known documents (J. Brandrup. E. H. Immergut, E. A. Grulke, Polymer Handbook, 4th ed., John Wiley & Sons, New York, 1999).

The solution comprising the polymer, a good solvent and a nonsolvent for the polymer can be, for example, a solution comprising 0.3 to 60 percent by weight of the polymer; and 40 to 99.7 percent by weight of a solvent mixture comprising 60 to 95 percent by weight of the good solvent and 5 to 40 percent by weight of the nonsolvent. When the proportion of the polymer is less than 0.3 percent by weight, the resulting porous film may often have decreased film strength. If it exceeds 60 percent by weight, a uniform solution may not be formed in many cases. If the proportion of the nonsolvent is less than 5 percent by weight, the effect of addition of the nonsolvent may be lost and a dense layer may tend to be formed. If it exceeds 40 percent by weight, a uniform solution may not be formed in many cases.

The method of flow-casting a solution comprising the polymer, a good solvent and a nonsolvent for the polymer into a film to yield a cast film can be carried out, for example, by flow-casting the solution onto a substrate or a movable belt or by extruding the solution from a T-die.

Preferred porous film base, substrate, and solidifying solvent can be those listed in the methods (i) and (ii).

The method (iii) can be carried out, for example, using the components and procedures described in JP-A No. 2001-145826.

The above-mentioned method can produce, for example, porous film bases which contain a multiplicity of communicating micropores (through holes) and have an average pore size of 0.01 to 5 µm, a largest pore size of 10 µm or less, a porosity of 15% to 80%, an air permeability of 30 seconds per 100 cc to 2000 seconds per 100 cc, and a thickness of 5 to 100 µm.

The diameters of micropores, porosity, air permeability, and rate of open pores of the porous film base in the present invention can be adjusted to desired levels by appropriately selecting or setting the types and amounts of constitutive components of the substrate and polymer solution, the amount of water, and the humidity, temperature and time of flow casting, as mentioned above.

The methods for producing porous films according to the present invention comprise the steps of immersing the porous film base in a solution of a chemical-resistant polymeric compound or a precursor thereof, or spraying or applying the solution to the porous film base; and drying the resulting article to thereby yield a porous film covered with the chemical-resistant polymeric compound. When a precursor of a chemical-resistant macromolecular is used, the production methods further comprise the step of subjecting the dried article to treatment with at least one selected from the group consisting of heat, ultraviolet rays, visible radiations, electron beams, and radioactive rays, after carrying out, for example, application of the solution containing the precursor to the base and drying.

The precursor of a chemical-resistant polymeric compound can be monomer components (raw materials) constituting the chemical-resistant polymeric compound; oligomers (reaction intermediates) as a result of addition or polymerization of such monomer components to a certain extent; and mixtures thereof. Specific examples of the monomer components constituting the polymeric compound are phenol derivatives and formaldehyde for constituting phenolic resins; xylene and formaldehyde for constituting xylene resins; urea derivatives and formaldehyde for constituting urea resins; melamine derivatives and formaldehyde for constituting melamine resins; benzoguanamine derivatives and formaldehyde for constituting benzoguanamine resins; aromatic tetracarboxylic acid dianhydrides and aromatic diamines for constituting polyimide resins; epoxy-containing compounds for constituting epoxy resins; benzoxazine monomers for constituting benzoxazine resins; and polyhydric alcohols and diisocyanates for constituting polyurethane resins.

The phenol derivatives for constituting phenolic resins include, for example, phenol, cresol, resorcinol, alkylphenols, and p-phenylphenol. The precursor for forming a coat onto the porous film base can be a monomer as intact but is preferably an oligomer or a resin after adding or polymerizing the monomer to a certain extent. Thus, a crosslinking reaction in subsequent step can be carried out easily and conveniently.

Of oligomers formed from a phenol derivative and formaldehyde for constituting phenolic resins, those obtained by reacting in the presence of an excess of a phenol derivative by the catalysis of an alkali catalyst are called "resols", and those obtained by reacting in the presence of an excess of formaldehyde by the catalysis of an acid catalyst are called "novolacs". Generally, resols are cured by the action of heat, an acid or pressurization, and novolacs are cured by mixing them with a curing agent such as hexamine or an epoxy resin and heating the mixture. Resols may be mixed with novolacs before heating.

Resols and novolacs can exist as any of liquids and solids. In general, resols are used in the form of liquids, and novolacs are used in the form of solids. Resols include various modified products such as xylene-modified products, melamine-modified products, furan-modified products, and ether-modified products. Such resols and modified products thereof are commercially available as solutions in solvents such as alcohols, acetone, and water. Examples of commercially available products of resols are "SUMILITERESIN PR-9480" of a regular grade, "SUMILITERESIN PR-50626" excellent typically in flexibility, adhesion, and elasticity, and "SUMILITERESIN PR-912" excellent typically in water resistance and alkali resistance, each available from Sumitomo Bakelite Co., Ltd.

It is interesting that phenolic resins are repellent to neutral water, but show hydrophilicity in alkaline (basic) aqueous solutions because of ionization of phenolic hydroxy groups. Since resols used as precursors of phenolic resins have methylol groups that act as crosslinking points and also as hydrophilic groups, phenolic resins excellent in hydrophilicity can be obtained by shortening the heating time in crosslinking to thereby retain a lot of methylol groups. Thus, porous films having excellent chemical resistance and having a hydrophilic surface can be obtained.

Xylene resins are generally excellent in, for example, water resistance, alkali resistance, flexibility, and adhesion. Xylene resins include a variety of modified products such as alkylphenol-modified resins, novolac-type resins, resol-type resins, polyol-type resins, epoxy-modified resins, ethylene oxide-added modified resins. Resol-type xylene resins can be used in the same methods as in resol phenolic resins. They are commercially available as, for example, a resol-type xylene resin solution (trade name: NIKANOL GR-L) from Fudow Corporation. Polyol-type xylene resins can be cured by heating and resulting dehydration condensation of alcohol. They are commercially available, for example, as a polyol-type xylene resin (trade name: NIKANOL K-140) from Fudow Corporation.

Epoxy-containing compounds constituting epoxy resins include a wide variety of compounds from low-molecular-weight compounds to high-molecular-weight compounds. The number of epoxy groups in one molecule ranges from one to several tens. Representative epoxy-containing compounds include, for example, bisphenol-A epoxy resins, bisphenol-F epoxy resins, bisphenol-AD epoxy resins, hydrogenated bisphenol-A epoxy resins, novolac epoxy resins, other phenol derivative-type epoxy resins, alicyclic epoxy resins, polyol epoxy resins (e.g., glycerol epoxy resins, ethylene glycol epoxy resins, diethylene glycol epoxy resins, polyethylene glycol epoxy resins, propylene glycol epoxy resins, dipropylene glycol epoxy resins, and polypropylene glycol epoxy resins), polyolefin epoxy resins, and amine epoxy resins.

The epoxy resins can be obtained by polymerizing epoxy-containing compounds alone by heating, or polymerizing them typically using cationic-polymerization catalysts. Examples of the cationic-polymerization catalysts are heat-induced cationic-polymerization catalysts and photo-induced cationic-polymerization catalysts. For the heat-induced cationic-polymerization catalysts, for example, benzylsulfonium salts can be used. For the photo-induced cationic-polymerization catalysts, for example, triarylsulfonium salts and diaryliodonium salts can be used. As such sulfonium salts, commercially available products such as the "San-Aid SI series" from Sanshin Chemical Industry Co., Ltd. can be used.

Epoxy resins can be formed by polymerization reactions using the epoxy-containing compounds used alone or in combination typically with cationic-polymerization catalysts, as well as curing reactions using curing agents. Examples of the curing agents include aliphatic amines, polyamide resins, aromatic amines, amine salts, organic acids and anhydrides thereof, isocyanates, urea, melamine, phenol, phenolic resins, dicyandiamides, and alcohols. Catalysts such as imidazole derivatives can also be used in curing reactions. Curing agents may not always be used.

Epoxy resins comprise hydroxy groups in their structure or can yield hydroxy groups and can thereby make the surface covering the porous film hydrophilic. Procedures for forming hydroxy groups in epoxy resins include polymerization reactions of epoxy-containing compounds alone, reaction of epoxy-containing compounds in combination with curing agents, and simple ring-opening of epoxy groups. Since there are many procedures for yielding hydroxy groups, the covered surface can be made hydrophilic.

Benzoxazine resins can be obtained by polymerizing benzoxazine monomer alone or in combination with, for example, phenols, organic acids, and/or epoxy resins.

The chemical-resistant polymeric compound or a precursor thereof is used as a solution in a solvent. The solvent is not specifically limited, as long as it can dissolve the polymeric compound or a precursor thereof therein, and includes dimethyl sulfoxide (DMSO), N,N-dimethylformamide (DMF), N,N-dimethylacetamide (DMAc), N-methyl-2-pyrrolidone (NMP), 2-pyrrolidone, cyclohexanone, methanol, ethanol, butanol, isopropyl alcohol, acetone, methyl acetate, ethyl acetate, ethyl lactate, acetonitrile, methylene chloride, chloroform, tetrachloroethane, tetrahydrofuran (THF), benzene, toluene, xylenes, water, and mixtures thereof. Among them, solvents that can easily volatilize are preferred from the viewpoints of economical efficacy in drying after application and excellent uniformity of films after drying.

A coat of the chemical-resistant polymeric compound or a precursor thereof can be formed on the porous film base by subjecting a solution of the chemical-resistant polymeric compound or a precursor thereof in a solvent to a procedure for forming a coat, such as immersion, spraying, or application (coating). The coat may be formed, for example, by immersing the film base in the solution, or by spraying or applying the solution to the film base. However, any other procedure can be used in combination. The formation of coat can be carried out in one process or in plural processes. Plural coating processes using different types of the polymeric compounds or precursors thereof can also be carried out.

The solution for use in the formation of coat may comprise, for example, about 0.1 to about 40 percent by weight of the polymeric compound or a precursor thereof and about 99.9 to about 60 percent by weight of the solvent. The solution preferably comprises about 0.2 to about 20 percent by weight of the former and about 99.8 to about 80 percent by weight of the latter, and more preferably comprises about 0.5 to about 10 percent by weight of the former and about 99.5 to about 90 percent by weight of the latter. If the concentration of the former is excessively low, the resulting layer may be thin to thereby fail to exhibit the chemical resistance effectively, and the coat may often become uneven. If the concentration of the former is excessively high, the porosity of the porous film may often decrease and the workability may often deteriorate due to an increased viscosity of the solution.

By drying a formed coat, a coat of the chemical-resistant polymeric compound or a precursor thereof can be formed on the porous film base. The drying can be air drying or forced drying such as heating or blowing.

The amount of the coat of the chemical-resistant polymeric compound is not specifically limited, as long as the porous structure of the porous film base can be maintained, and is, for example, about 0.01 to about 50 percent by weight, preferably about 0.1 to about 40 percent by weight, and more preferably about 0.3 to about 30 percent by weight relative to the porous film. An excessively large amount of the chemical-resistant polymeric compound may invite clogging of micropores or reduce the communicating ability of micropores. In contrast, an excessively small amount of the chemical-resistant polymeric compound may invite insufficient coating or uneven coating of the surface of porous film base.

After forming a coat of the chemical-resistant polymeric compound or a precursor thereof on the porous film base by the above-mentioned method, the resulting article can further be subjected to treatment with at least one selected from the group consisting of heat, ultraviolet rays, visible radiations, electron beams, and radioactive rays. The treatment allows the polymerization, crosslinking, and/or curing of a precursor constituting the coat to proceed to thereby form a polymeric compound. When the coat comprises a polymeric compound, for example, the crosslinking and/or curing of the polymeric compound proceeds to thereby further improve the chemical resistance. Thus, porous films with more excellent chemical resistance can be obtained.

For example, when the epoxy resins are formed by polymerization of epoxy-containing compounds typically using a cationic-polymerization catalyst, the cationic-polymerization catalyst can have accelerated catalytic ability as a result of ultraviolet irradiation to thereby cure the epoxy resins.

The temperature in the heat treatment can be selected within a wide range of from room temperature to about 300° C. The heating time is not specifically limited and is set as appropriate according to a desired curing state. The heating conditions may be set as appropriate typically in consideration of productivity and physical properties of the porous film base to be covered.

In the methods for producing porous films according to the present invention, it is preferred that a porous film that can be produced easily is initially produced, and the porous film is then covered with a polymer having desired properties from the viewpoint of easiness in production. When the chemical-resistant polymeric compound is expensive, a porous film base comprising inexpensive materials is used for reducing the whole cost from the viewpoint of economical efficiency.

The methods for producing porous films according to the present invention can easily produce porous films that are excellent in chemical resistance and have homogeneous micropores.

EXAMPLES

The present invention will be illustrated in further detail with reference to several Examples below, which by no means limit the scope of the present invention. The average pore size and porosity of a film in Preparation Example 1 were determined by calculation according to the following methods. These average pore size and porosity were determined on micropores viewed in the front most of electron micrographs, while micropores viewed backward were excluded from the measurement.

Average Pore Size

Arbitrary thirty or more pores on a surface of a sample film viewed in an electron micrograph were selected, the areas of the selected pores were determined, and the average thereof was defined as the average pore area $S_{ave}$. Assuming that the pores are perfect circles, the average pore area was converted into a pore size (pore diameter) according to the following equation, and the converted value was defined as the average pore size. In the equation, $\pi$ represents the ratio of the circumference of a circle to its diameter.

$$\text{Average Pore Size of Surface}[\mu m] = 2 \times (S_{ave}/\pi)^{1/2}$$

Porosity

The porosity of the inside of a sample film was determined by calculation according to the following equation, wherein V represents the volume of the film [cm$^3$]; W represents the weight of the film [g]; and $\rho$ represents the density of the film material [g/cm$^3$]. The density of a polyamide-imide was set at 1.45 [g/cm$^3$].

$$\text{Porosity}[\%] = 100 - 100 \times W/(\rho V)$$

Air Permeability

The air permeability was measured according to Japanese Industrial Standards (JIS) P8117 using the Gurley's Densometer available from Yoshimitsu Kagaku Kiki K.K. However, the measured permeability was converted into a standard Gurley air-permeability in accordance with the Appendix 1 of JIS P8117, since the apparatus having a measuring area of one-tenth of the standard measuring area was used.

Pure-Water Permeation Rate

The pure-water permeation rate was determined using the flat membrane filter of AMICON STIRRED ULTRAFILTRATION CELLS MODEL 8200. The permeation area (effective membrane area) was 28.7 cm$^2$. In the determination, a filter paper was placed as a substitute for a spacer in the permeation side so as to eliminate the resistance in the permeation side as much as possible. The measurement was conducted at a pressure of 0.5 kg/cm$^2$, and the measured value was converted. The measurement-temperature was 25° C.

Preparation Example 1

Production of Porous Film Base 1

A film-forming composition was prepared by adding 30 parts by weight of a polyvinylpyrrolidone having a molecular weight of 5×10$^4$ to 100 parts by weight of "VYLOMAX HR11NN" (trade name, available from Toyobo Co., Ltd.) which is a solution, in solvent NMP, of an amide-imide polymer having a surface tension as polymer alone of 42 mN/m (=dyn/cm) (measured value), a solid content of 15 percent by weight, and a viscosity as solution of 20 dpa·s at 25° C. This film-forming composition was set in temperature at 25° C. and was cast onto a substrate comprising a PET sheet (Type S, available from DuPont Teijin Films, Ltd., having a surface tension of 39 mN/m (=dyn/cm) (measured value)) using a film applicator. Immediately after casting, the cast article was placed in a vessel and held at humidity of about 100% and a temperature of 50° C. for four minutes. The article was subjected to phase conversion by immersing in water, thus solidifying and drying and thereby yielded a porous film base (porous sheet). In this procedure, the gap between the film applicator and the PET sheet substrate was set at 127 μm, and the resulting film had a thickness of about 50 μm.

The membrane structure of the film was observed to find that pores in one film surface which had been in contact with the substrate upon casting (substrate-facing surface of the film) had an average pore size of about 0.9 μm, pores in the other film surface which had not been in contact with the substrate upon casting (air-facing surface of the film) had an average pore size of about 1.1 μm, and that the film was substantially homogenous in its inside and had communicating micropores all over its inside. The film had an inner porosity of 70%. The permeation performance was measured to find that the film has excellent permeation performance of a Gurley air permeability of 9.5 sec and a pure-water permeation rate of 9.8×10$^{-9}$ m·sec$^{-1}$·Pa$^{-1}$ [i.e., 60 L/(m$^2$·min·atm at 25° C.)].

Preparation Example 2

Production of Porous Film Base 2

Porous Film Base 2 having a thickness of about 50 μm was prepared by the procedure of Preparation Example 1, except for using 33.3 parts by weight of the polyvinylpyrrolidone having a molecular weight of 5×10$^4$.

The membrane structure of the film was observed to find that pores in the substrate-facing surface of the film had an average pore size of about 0.5 μm, pores in the air-facing surface of the film had an average pore size of about 0.6 μm, and the film had substantially homogenous inside and had communicating micropores all over its inside. The film had an inner porosity of 70%.

Preparation Example 3

Production of Porous Film Base 3

A polyimide precursor solution was prepared by dissolving 3,3',4,4'-biphenyltetracarboxylic acid dianhydride (s-BPDA) and 4,4'-diaminodiphenyl ether (DADE) in NMP to a total concentration of the two monomer components of 18 percent by weight in a molar ratio of DADE to s-BPDA of 0.994, and carrying out polymerization at 40° C. for six hours. A film-forming composition was then prepared by adding 33.3 parts by weight of a polyvinylpyrrolidone having a molecular weight of $5 \times 10^4$ to 100 parts by weight of the polyimide precursor solution. This film-forming composition was set in temperature at 25° C. and was cast onto a glass plate using a film applicator. Immediately after casting, the cast article was placed in a vessel and held at humidity of about 100% and a temperature of 50° C. for eight minutes. The article was subjected to phase conversion by immersing in water, thus solidifying and drying and thereby yielded a polyimide precursor porous film base (porous sheet). In this procedure, the gap between the film applicator and the glass plate was set at 127 μm, and the resulting film had a thickness of about 50 μm.

The film was fixed on a stainless steel (SUS according to JIS) plate using a tape and subjected to heat treatment at 300° C. in the air for twenty minutes and thereby yielded a polyimide porous film base.

The membrane structure of the film was observed to find that pores in a film surface which had been in contact with the glass plate upon casting (glass plate-facing surface of the film) had an average pore size of about 0.5 μm and pores in a film surface which had not been in contact with the glass plate upon casting (air-facing surface of the film) had an average pore size of about 0.5 μm, and the film had substantially homogenous inside and had communicating micropores all over its inside. The film had an inner porosity of 71%, as determined while setting the density of the polyimide at 1.39 g/cm².

Example 1

A phenolic resin solution available from Sumitomo Bakelite Co., Ltd. under the trade name of SUMILITERESIN PR-9480 was diluted with methanol and thereby yielded a coating composition comprising 1 part by weight of the phenolic resin and 100 parts by weight of the solvent.

Porous Film Base 1 (porous sheet) prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for five minutes to thereby cure the phenolic resin.

Example 2

A phenolic resin solution available from Sumitomo Bakelite Co., Ltd. under the trade name of SUMILITERESIN PR-9480 was diluted with methanol and thereby yielded a coating composition comprising 1 part by weight of the phenolic resin and 100 parts by weight of the solvents.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for ten minutes to thereby cure the phenolic resin.

Example 3

A phenolic resin solution available from Sumitomo Bakelite Co., Ltd. under the trade name of SUMILITERESIN PR-9480 was diluted with methanol and thereby yielded a coating composition comprising 1 part by weight of the phenolic resin and 100 parts by weight of the solvent.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for twenty minutes to thereby cure the phenolic resin.

Example 4

A phenolic resin solution available from Sumitomo Bakelite Co., Ltd. under the trade name of SUMILITERESIN PR-5062 was diluted with methanol and thereby yielded a coating composition comprising 1 part by weight of the phenolic resin and 100 parts by weight of the solvent.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for twenty minutes to thereby cure the phenolic resin.

Example 5

A cresol resin solution available from Sumitomo Bakelite Co., Ltd. under the trade name of SUMILITERESIN PR-912 was diluted with methanol and thereby yielded a coating composition comprising 1 part by weight of the cresol resin and 100 parts by weight of the solvent.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for twenty minutes to thereby cure the cresol resin.

Example 6

A xylene resin solution available from Fudow Corporation under the trade name of NIKANOL GR-L was diluted with methanol and thereby yielded a coating composition comprising 1 part by weight of the xylene resin and 100 parts by weight of the solvent.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for forty minutes to thereby cure the cresol resin.

Example 7

A polyol-type xylene resin solution available from Fudow Corporation under the trade name of NIKANOL K-140 was diluted with xylene and thereby yielded a coating composition comprising 1 part by weight of the xylene resin and 100 parts by weight of the solvent.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for one hundred and twenty minutes to thereby cure the xylene resin.

Example 8

By diluting 0.39 part of a poly(p-vinylphenol) available from Maruzen Petrochemical Co., Ltd. under the trade name of Marukalinker M and 0.61 part of an alicyclic epoxy resin available from Daicel Chemical Industries, Ltd. under the trade name of EHPE-3150 with methanol, a coating composition comprising 0.39 parts by weight of the poly(p-vinylphenol), 0.61 part by weight of the alicyclic epoxy resin, and 100 parts by weight of the solvent was prepared.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for one hundred and twenty minutes to thereby cure the poly(p-vinylphenol)/alicyclic epoxy resin.

Example 9

A novolac epoxy resin available from Tohto Kasei Co., Ltd. under the trade name of YDCN-701 was diluted with xylene and thereby yielded a coating composition comprising 1 part by weight of the novolac epoxy resin and 100 parts by weight of the solvent.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for one hundred and twenty minutes to thereby cure the novolac epoxy resin.

Example 10

A novolac epoxy resin available from Tohto Kasei Co., Ltd. under the trade name of YDCN-701 was diluted with xylene. Then, a cationic-polymerization initiator under the trade name of San-Aid S1-100L was added and thereby yielded a coating composition comprising 1 part by weight of the novolak epoxy resin, 0.02 part by weight of the cationic-polymerization initiator, and 100 parts by weight of the solvent.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for one hundred and twenty minutes to thereby cure the novolac epoxy resin.

Example 11

A BPA-type epoxy resin available from Tohto Kasei Co., Ltd. under the trade name of YD-128 was diluted with xylene and thereby yielded a coating composition comprising 1 part by weight of the BPA-type epoxy resin and 100 parts by weight of the solvent.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 220° C. for one hundred and twenty minutes to thereby cure the BPA-type epoxy resin.

Example 12

A fluororesin for coating available from Asahi Glass Co., Ltd. under the trade name of Lumiflon LF-200 and a polyisocyanate compound available from Nippon Polyurethane Industry Co., Ltd. under the trade name of Collonate HX were diluted with xylene and thereby yielded a coating composition comprising 0.86 part by weight of the fluororesin, 0.14 part by weight of the polyisocyanate compound, and 100 parts by weight of the solvent.

The porous sheet prepared in Preparation Example 1 was immersed in the above-prepared coating composition for three minutes, taken out from the coating composition, and air-dried. The dried porous sheet was then placed between stainless steel (SUS) plates and heated in an oven at a temperature of 120° C. for sixty minutes to thereby cure the fluororesin/polyisocyanate compound.

Example 13

An ethylene/vinyl alcohol copolymer available from Kuraray Co., Ltd. under the trade name of EVAL F101 (ethylene content of 32 percent by mole, melt index MI of 1.6 g/10-min. at 190° C., 2160 g) was dissolved in a solvent mixture containing 65 parts by weight of n-propanol and 35 parts by weight of water at 75° C. The resulting solution had a solid content of the ethylene/vinyl alcohol copolymer of 5 percent by weight. An epoxy compound available from Nagase Chemtex Corporation under the trade name of Deconal EX810 as a crosslinking agent was added to the solution to an amount of 20 percent by weight relative to the ethylene/vinyl alcohol copolymer and thereby yielded a coating composition.

The porous sheet prepared in Preparation Example 1 was immersed in the above-prepared coating composition for two minutes, taken out from the coating composition, and air-dried. The dried porous sheet was then placed between 100-μm Teflon (registered trademark) films and heated in an oven at a temperature of 160° C. for thirty minute to thereby cure the ethylene/vinyl alcohol copolymer and the epoxy compound.

Example 14

A phenolic resin solution available from Sumitomo Bakelite Co., Ltd. under the trade name of SUMILITERESIN PR-9480 was diluted with methanol and thereby yielded a coating composition comprising 1 part by weight of the phenolic resin and 100 parts by weight of the solvent.

The porous sheet prepared in Preparation Example 1 was molded into a 5-cm square sheet and its weight was measured to find to be 0.041 g. This sample was immersed in the above-prepared coating composition for three minutes, taken out from the coating composition, and air-dried. The dried porous sheet was then placed between stainless steel (SUS) plates and heated in an oven at a temperature of 220° C. for ten minutes to thereby cure the phenolic resin. The weight of the article after heating was measured and found to be 0.046 g. The amount of the coating phenolic resin was therefore 0.005 g and stood at about 11 percent by weight to the resulting porous film.

Example 15

A novolac epoxy resin available from Tohto Kasei Co., Ltd. under the trade name of YDCN-701 was diluted with xylene and thereby yielded a coating composition comprising 1 part by weight of the novolac epoxy resin and 100 parts by weight of the solvent.

The porous film prepared in Preparation Example 1 was molded into a 7-cm square sheet and its weight was measured to find to be 0.069 g. This sample was immersed in the above-prepared coating composition for three minutes, taken out from the coating composition, and air-dried. The dried porous sheet was then placed between stainless steel (SUS) plates and heated in an oven at a temperature of 220° C. for one hundred and twenty minutes to thereby cure the novolac epoxy resin. The weight of the article after heating was measured and found to be 0.070 g. Accordingly, the amount of the coating novolac epoxy resin was 0.001 g and stood at about 1 percent by weight to the resulting porous film.

Example 16

The procedure of Example 15 was repeated, except for using Porous Film Base 2 prepared in Preparation Example 2 instead of the porous sheet prepared in Preparation Example 1.

Porous Film Base 2 prepared in Preparation Example 2 was molded into a 7-cm square sheet, its weight was measured and was found to be 0.071 g. The weight of the article after heating was found to be 0.072 g. Accordingly, the amount of the coating novolac epoxy resin was 0.001 g and fell at about 1 percent by weight to the resulting porous film.

Example 17

A novolac epoxy resin available from Tohto Kasei Co., Ltd. under the trade name of YDCN-701 was diluted with xylene and thereby yielded a coating composition comprising 16 parts by weight of the novolac epoxy resin and 100 parts by weight of the solvent.

Porous Film Base 2 prepared in Preparation Example 2 was molded into a rectangular sheet 7 cm long and 5 cm wide, its weight was measured and found to be 0.055 g. This sample was immersed in the above-prepared coating composition for three minutes, taken out from the coating composition, and air-dried. Next, the dried Porous Film Base 2 was placed between stainless steel (SUS) plates and heated in an oven at a temperature of 220° C. for one hundred and twenty minutes to thereby cure the novolac epoxy resin. The weight of the article after heating was found to be 0.087 g. Accordingly, the amount of the coating novolac epoxy resin was 0.032 g and fell at about 37 percent by weight to the resulting porous film.

Example 18

A phenolic resin solution available from Sumitomo Bakelite Co., Ltd. under the trade name of SUMILITERESIN PR-9480 was diluted with methanol and thereby yielded a coating composition comprising 1 part by weight of the phenolic resin and 100 parts by weight of the solvent.

The porous sheet prepared in Preparation Example 3 was immersed in the above-prepared coating composition for three minutes, taken out from the coating composition, and air-dried. The dried porous sheet was then placed between stainless steel (SUS) plates and heated in an oven at a temperature of 220° C. for twenty minutes to thereby cure the phenolic resin.

Example 19

A novolac epoxy resin available from Tohto Kasei Co., Ltd. under the trade name of YDCN-701 was diluted with xylene and thereby yielded a coating composition comprising 5 parts by weight of the novolac epoxy resin and 100 parts by weight of the solvents.

The porous sheet prepared in Preparation Example 3 was immersed in the above-prepared coating composition for three minutes, taken out from the coating composition, and air-dried. The dried porous sheet was then placed between stainless steel (SUS) plates and heated in an oven at a temperature of 220° C. for one hundred and twenty minutes to thereby cure the novolac epoxy resin.

Example 20

A fluororesin for coating available from Asahi Glass Co., Ltd. under the trade name of Lumiflon LF-200 and a polyisocyanate compound available from Nippon Polyurethane Industry Co., Ltd. under the trade name of Collonate HX were diluted with xylene and thereby yielded a coating composition comprising 0.86 part by weight of the fluororesin, 0.14 part by weight of the polyisocyanate compound, and 100 parts by weight of the solvent.

The porous sheet prepared in Preparation Example 3 was immersed in the above-prepared coating composition for three minutes, taken out from the coating composition, and air-dried. The dried porous sheet was then placed between stainless steel (SUS) plates and heated in an oven at a temperature of 120° C. for sixty minutes to thereby cure the fluororesin/polyisocyanate compound.

(Evaluation Tests)

Change in Film Shape

Figure 1:
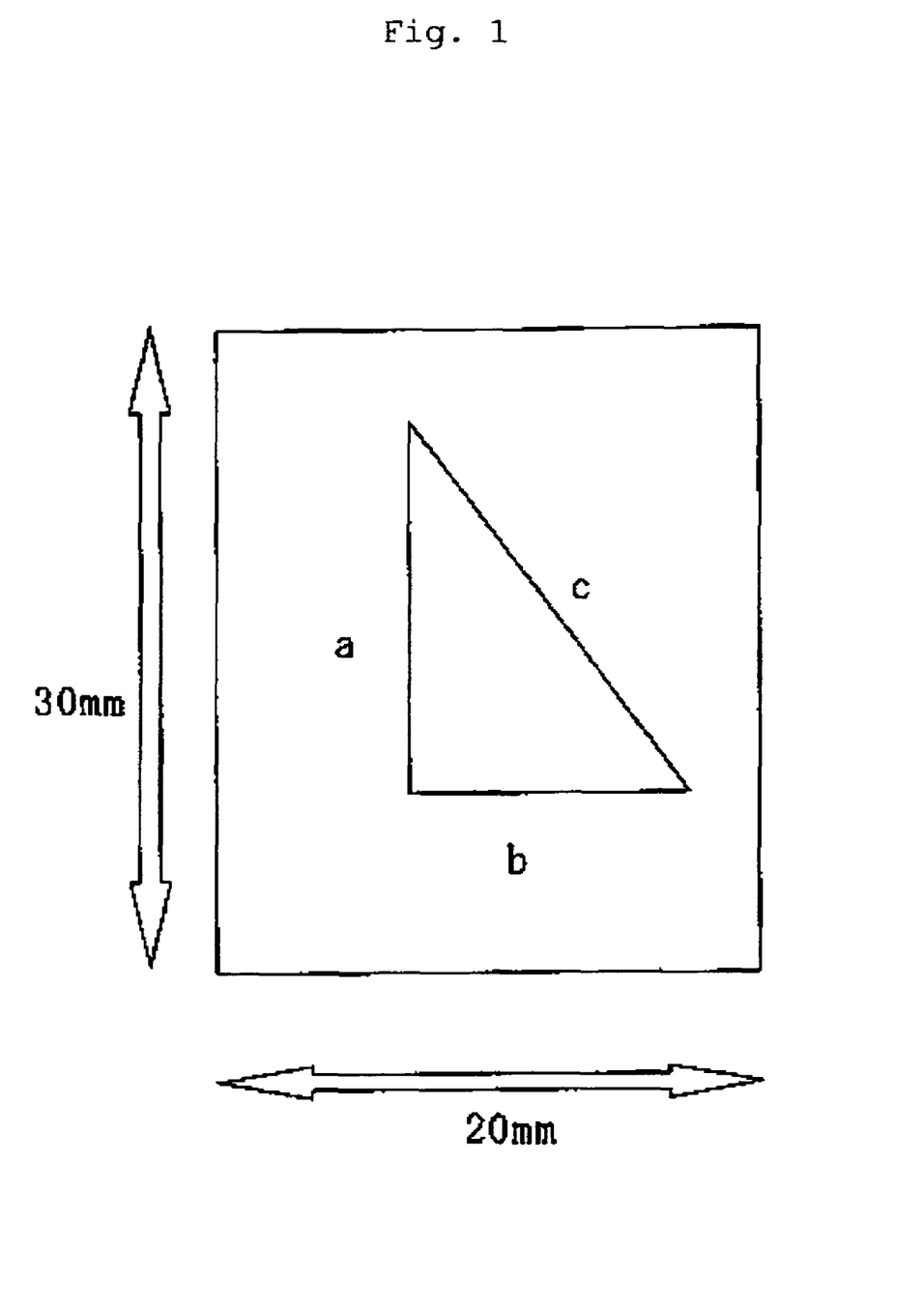
FIG. 1 is an explanatory diagram (front view) of a test for evaluating a change in film shape.

The porous film base prepared in Preparation Example 1 and the porous films prepared in Examples 1 to 13 were shaped into samples 30 mm wide and 20 mm long each having three small holes at three points constituting the apexes of a triangle having sides with lengths of 8 to 30 mm as illustrated in FIG. 1. The distances between two of the three points a, b, and c were measured and changes in distances of the samples were determined. Initially, the initial distances $a_1$, $b_1$, and $c_1$ were measured. Next, about 50 cc of tetrahydrofuran (THF) as a solvent was placed in a Petri dish having a diameter of about 100 mm, and the samples were immersed therein.

Two minutes into the immersion, the samples were taken out, placed between slides so as to avoid drying, and the distances $a_2$, $b_2$, and $c_2$ were measured. The samples were taken out from the slides, air-dried, left stand at room temperature, and the distances $a_3$, $b_3$, and $C_3$ were measured ten minutes later. The rates of change in a, b, and c, respectively, were determined by calculation according to the following equation.

$$\text{Rate of change in ``}a\text{'' after immersion (\%)} = \{(a_2 - a_1)/a_1\} \times 100$$

$$\text{Rate of change in ``}a\text{'' after drying (\%)} = \{(a_3 - a_1)/a_1\} \times 100$$

The rates of change in b ($b_1$, $b_2$, $b_3$) and c ($c_1$, $c_2$, and $c_3$) were determined by the same manner as above.

When the rate of change is positive (plus), it means that the sample porous film expands (swells). If it is negative (minus), it means that the sample film shrinks. The results are shown in Table 1. In Table 1, the symbol "*" means that the distances could not be measured and the rates of change could not be determined due to excessive film.

TABLE 1

|  | Rate of change after immersion [%] | | | Rate of change after drying [%] | | |
|---|---|---|---|---|---|---|
|  | a | b | c | a | b | c |
| Preparation Example 1 | 12 | 11 | 13 | * | * | * |
| Example 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| 4 | 0 | 0 | 0 | 0 | 0 | 0 |
| 5 | 0 | 0 | 0 | 0 | 0 | 0 |
| 6 | 0 | 0 | 0 | 0 | 0 | 0 |
| 7 | 0 | 0 | 0 | 0 | 0 | 0 |
| 8 | 0 | 0 | 0 | 0 | 0 | 0 |
| 9 | 0 | 0 | 0 | 0 | 0 | 0 |
| 10 | 0 | 0 | 0 | 0 | 0 | 0 |
| 11 | 0 | 0 | 0 | 0 | 0 | 0 |
| 12 | 0 | 0 | 0 | 0 | 0 | 0 |
| 13 | 0 | 0 | 0 | 0 | 0 | 0 |

Porous Film Base 1 according to Preparation Example 1 showed swelled upon immersion in THF, significantly deformed after drying, and the distances could not be measured. The porous films of Examples 1 to 13 showed no swelled upon immersion in THF and no shrinkage upon drying, verifing that the coating with a chemical-resistant polymeric compound is very effective. Porous Film Base 1 according to Preparation Example 1 once rolled up and then returned to the original shape when placed in THF. In addition, it significantly deformed and became transparent upon air-drying. In contrast, the porous films according to Examples 1 to 13 showed no change upon placement into THF and air-drying.

Observation of Porous Structure

The porous sheet of amide-imide polymer prepared in Preparation Example 1 and the corresponding porous film having a surface covered with a phenolic resin according to Example 3 were observed and compared under the electron microscope JSM-820 (JEOL DATUM LTD.) at a magnification of 5000 times.

The porous film according to Example 3 had somewhat flat surfaces at both sides, since it had been heated while being placed between the stainless steel (SUS) plates, but had essentially the same porous structure as Porous Film Base 1 according to Preparation Example 1. This verifies that the porous film according to Example 3 maintains its porous structure having a multiplicity of communicating micropores even when covered with the phenolic resin.

The porous film according to Example 3 had a thickness of about 50 μm, an average pore size of about 1 μm, and a porosity of about 70% and showed permeation performance at the same level as the raw material Porous Film Base 1. The similar results were obtained on the other Examples.

Alkali Resistance Test 1

The amide-imide polymer porous sheet according to Preparation Example 1 and the amide-imide polymer porous films according to Examples 3 to 11, and 13 covered with chemical-resistant polymeric compounds were immersed in a 0.1 N aqueous sodium hydroxide solution at a temperature of 30° C. for three hours, and the chemical resistances of the films to the alkaline aqueous solution were determined by infrared absorption spectral analysis.

The disappearance of the absorption at around 1720 and 1780 $cm^{-1}$ derived from imide groups in the infrared absorption spectral analysis was used as an index that imide groups in the amide-imide polymer are hydrolyzed by the action of an alkali (base) to form a carboxylic acid. Namely, when the absorption at around 1720 and 1780 $cm^{-1}$ disappears, it means that the film in question does not have alkali resistance.

In the porous sheet according to Preparation Example 1, the absorption at around 1720 and 1780 $cm^{-1}$ disappeared, showing that the porous sheet undergoes hydrolysis of imide groups by the action of the alkali. In contrast, the porous films according to Examples 3 to 11, and 13 show the above-mentioned absorption, showing that imide groups are not hydrolyzed. The results verify that the coatings with these polymeric compounds are very effective against the alkaline aqueous solution.

Alkali Resistance Test 2

The imide polymer porous sheet prepared in Preparation Example 3 and the corresponding imide polymer porous films according to Examples 18 to 20 covered with chemical-resistant polymeric compounds were immersed in a 0.1 N aqueous sodium hydroxide solution at a temperature of 30° C. for ten hours, and the chemical resistances of the films to the alkaline aqueous solution were determined by infrared absorption spectral analysis.

The disappearance of the absorption at around 1720 and 1770 $cm^{-1}$ derived from imide groups in the infrared absorption spectral analysis was used as an index that imide groups in the imide polymer are hydrolyzed by the action of an alkali to form a carboxylic acid. Namely, when the absorption at around 1720 and 1770 $cm^{-1}$ disappear, it means that the film in question does not have alkali resistance.

In the porous sheet according to Preparation Example 3, the absorption at around 1720 and 1770 $cm^{-1}$ disappeared, showing that the porous sheet undergoes hydrolysis of imide groups by the action of the alkali (base). In contrast, the porous films according to Examples 18 to 20 show the above-mentioned absorption, indicating that imide groups are not hydrolyzed. The results verify that the coatings with these polymeric compounds are very effective against the alkaline aqueous solution.

Hydrophilicity

The porous films according to Examples 1 to 3 and 9 to 12 were immersed in ion-exchanged water or a 0.1 N aqueous sodium hydroxide solution, and whether the films floated or sank was observed.

A porous film has the air in pores inside thereof. Accordingly, the porous film containing the air floats when a polymeric compound covering the porous film has a low affinity for a liquid in which the porous film is immersed. In contrast, the porous film sinks when the polymeric compound has a high affinity for the liquid, since the liquid expels air from the inside of pores and enters inside the film. The results are shown in Table 2. In Table 2, the "Coating condition" indicates, for example, the type of polymeric compounds used in coating in Examples.

TABLE 2

|  |  | Coating condition | | | Ion-exchanged water | Aqueous sodium hydroxide solution |
|---|---|---|---|---|---|---|
| Example | 1 | phenolic resin | curing time | 5 min | float | sink |
|  | 2 |  |  | 10 min | float | sink |
|  | 3 |  |  | 20 min | float | sink |

TABLE 2-continued

|   | Coating condition | Ion-exchanged water | Aqueous sodium hydroxide solution |
|---|---|---|---|
| 9 | novolac epoxy   initiator   no | sink | sink |
| 10 | resin   yes | sink | sink |
| 11 | BPA epoxy resin | sink | sink |
| 12 | fluororesin/polyisocyanate compound | float | float |

The porous films according to Examples 1 to 3 have low wettability to ion-exchanged water but high wettability to the 0.1 N aqueous sodium hydroxide solution. The porous films according to Examples 9 to 11 sink in the both liquids and have wettability both to the neutral ion-exchanged water and to the basic 0.1 N aqueous sodium hydroxide solution. The porous film according to Example 12 has low wettability both to the ion-exchanged water and to the 0.1 N aqueous sodium hydroxide solution.

Thus, the affinity to a liquid, such as hydrophilicity, can be changed by selecting the type of a polymeric compound for use in coating as appropriate.

The invention claimed is:

1. A porous film comprising a film base and a coat of a chemical-resistant polymeric compound, the film base produced by a phase conversion method in which mixtures containing polymers are cast as films and then introduced to solidifying liquids, the coat of the chemical-resistant polymeric compound forming a thin solid layer over cell wall surfaces throughout the porous structure of the film base, and formed by subjecting a solution of a chemical-resistant polymeric compound or a precursor thereof dissolved in a solvent which can dissolve the polymeric compound or a precursor thereof to a coat forming procedure, with or without further subjecting the coat formed to treatment with at least one selected from the group consisting of heat, ultraviolet rays, visible radiations, electron beams, and radioactive rays, wherein:

the porous film includes a multiplicity of communicating micropores having an average pore size of 0.01 μm or more and 5 μm or less;

an average rate of open pores inside the porous film (porosity) is 30% to 80%;

the porous film maintains the properties of the film base;

an amount of the coal of the chemical-resistant polymeric compound is 0.01 to 50 percent by weight relative to the porous film;

the film base comprises amide-imide polymers or imide polymers, and the coat of the chemical-resistant polymeric compound comprises at least one selected from the group consisting of phenolic resins, epoxy resins, fluororesins, and ethylene/vinyl alcohol copolymers.

2. A method for producing the porous film of claim 1, comprising the steps of immersing a porous film base in a solution of a chemical-resistant polymeric compound, the porous film base comprising a multiplicity of communicating micropores having an average pore size of more than 0.01 and less than 5 μm, or spraying or applying the solution to the porous film base; and drying the resulting article to cover the porous film base with the chemical-resistant polymeric compound, without immersing the porous film base in a non-solvent of the chemical-resistant polymeric compound or a precursor thereof, and without immersing the porous film base in a solution containing a non-solvent or the chemical-resistant polymeric compound or a precursor thereof, to thereby yield the porous film.

3. A method for producing the porous film of claim 1, comprising the steps of immersing a porous film base in a solution of a precursor of a chemical-resistant polymeric compound, the porous film base comprising a multiplicity of communicating micropores having an average pore size or 0.01 to 10 μm, or spraying or applying the solution to the porous film base; drying the resulting article; and subjecting the dried article to treatment with at least one selected from the group consisting of heat, ultraviolet rays, visible radiations, electron beams, and radioactive rays to cover the porous film base with the chemical-resistant polymeric compound to thereby yield the porous film.

* * * * *